United States Patent
O'Connell (10) Patent No.: US 11,297,824 B1
(45) Date of Patent: Apr. 12, 2022

(54) EXCLUSION BARRIER

(71) Applicant: Craig Patrick O'Connell, Ridgefield, CT (US)

(72) Inventor: Craig Patrick O'Connell, Ridgefield, CT (US)

( * ) Notice: Subject to any disclaimer, the term of this patent is extended or adjusted under 35 U.S.C. 154(b) by 0 days.

(21) Appl. No.: 17/357,290

(22) Filed: Jun. 24, 2021

(51) Int. Cl.
| | |
|---|---|
| *A01M 29/24* | (2011.01) |
| *E02B 1/00* | (2006.01) |
| *H01F 1/057* | (2006.01) |
| *B63B 5/02* | (2006.01) |
| *B63B 5/24* | (2006.01) |
| *F03B 13/00* | (2006.01) |
| *H02K 7/18* | (2006.01) |
| *H02S 10/10* | (2014.01) |
| *B63B 21/26* | (2006.01) |

(52) U.S. Cl.
CPC ............... *A01M 29/24* (2013.01); *B63B 5/02* (2013.01); *B63B 5/24* (2013.01); *B63B 21/26* (2013.01); *E02B 1/006* (2013.01); *F03B 13/00* (2013.01); *H01F 1/057* (2013.01); *H02K 7/1823* (2013.01); *H02S 10/10* (2014.12); *F05B 2220/32* (2013.01); *F05B 2240/9151* (2013.01); *F05B 2240/95* (2013.01)

(58) Field of Classification Search
CPC . A01M 29/24; B63B 5/02; B63B 5/21; B63B 21/26; E02B 1/006; H01F 1/057
See application file for complete search history.

(56) References Cited

U.S. PATENT DOCUMENTS

| | | | |
|---|---|---|---|
| 2,146,105 A | 2/1939 | Baker | |
| 4,950,104 A | 8/1990 | Streichenberger | |
| 5,884,585 A | 3/1999 | Streichenberger | |
| 6,056,476 A | 5/2000 | Streichenberger | |
| 6,060,153 A | 5/2000 | McNeil | |
| 6,244,218 B1 | 6/2001 | McNeil | |
| 6,388,949 B1 | 5/2002 | Lenhardt | |
| 7,302,905 B1 * | 12/2007 | Wynne | B63C 9/00 114/343 |
| 7,924,165 B2 * | 4/2011 | Vinano, Jr. | A01K 79/02 340/573.3 |
| 8,691,253 B1 | 4/2014 | Tracy | |

(Continued)

*Primary Examiner* — S. Joseph Morano
*Assistant Examiner* — Jovon E Hayes
(74) *Attorney, Agent, or Firm* — GS2Law LLP (57) ABSTRACT

An improved exclusion barrier including a plurality of elongate members extending in a generally upright condition between a sea floor and a sea surface. The elongate members are improved to provide a more uniform surface area for the prevention of sharks passing through upper portions of the barrier and maximizing the exclusion capabilities of the overall barrier network. The elongate members include, in addition to permanent magnets, hydro-electric power generation mechanisms for powering electro-magnets within the elongate members to produce a stronger electro-magnetic deterrent field across the barrier network, and also include telescoping mechanisms to allow for a variance in length of each member in coordination with changing wave and water levels and to provide additional pump action for hydro-electric power generation within each elongate member. The exclusion barrier is also secured to the sea floor by an anchoring base having evenly spaced anchoring locations.

20 Claims, 5 Drawing Sheets

(56) References Cited

U.S. PATENT DOCUMENTS

| | | | |
|---|---|---|---|
| 9,084,415 B2 | 7/2015 | Stroud | |
| 9,963,209 B2 * | 5/2018 | O'Connell | A01K 79/02 |
| 10,883,239 B2 * | 1/2021 | Rutzen | E02B 1/006 |
| 2007/0004297 A1 | 1/2007 | Wynne | |
| 2011/0094451 A1 | 4/2011 | Ward | |
| 2013/0139428 A1 * | 6/2013 | Smith | A01K 79/02 43/17.1 |
| 2013/0314044 A1 * | 11/2013 | Bahadik | H02J 7/1415 320/114 |
| 2017/0008604 A1 | 1/2017 | Buster | |

\* cited by examiner

EXCLUSION BARRIER

FIELD OF THE INVENTION

This invention relates to an improved shark exclusion barrier that is energy generating, semi-flexible and extendible over a wide surface area, and used for preventing sharks and rays from accessing designated areas.

BACKGROUND OF THE INVENTION

The applicant and named inventor in the present disclosure first created and originated the concepts for and development of environmentally friendly shark barriers utilizing flexible elongate members and magnetic fields within elongate members and is one of the named inventors of the subject matter of the "Shark Barrier" invention disclosed and claimed in U.S. Pat. No. 9,963,209, (the '209 Patent"). Further research and experimentation by the inventor/applicant of the present disclosure has revealed significant shortcomings with certain aspects of the barriers disclosed and claimed in the U.S. '209 Patent, regarding its efficacy in deterring certain species of sharks, such as bull sharks and white sharks, particularly due to the presence of gaps and openings in various sections of the barrier embodiments disclosed therein. It has been found that certain species of sharks tend to penetrate the barrier embodiments made according to the description and claims of the '209 Patent through openings, gaps or separations in the barrier network, which have therefore necessitated the development of improvements in the design and function of the individual elongate members and the integrity of the overall barrier network. The issues prevalent with the efficacy of the previous shark barrier design, identified as the "Sharksafe Barrier," were thoroughly explored and studied through experiments conducted previously and reported in the paper co-authored by the applicant entitled: Evaluating the Effects of a Large-Scale Sharksafe Barrier Shoreline Deployment on Bull Shark (*Carcharhinus leucas*) Behavior, C. P. O'Connell, J. Gressle, J. Crews, A. A. King, P. He, which contains the results and analysis of experimental evaluations of the Sharksafe Barrier, the entire content of which is incorporated by reference herein as if it formed a part of the disclosure of the present invention, and which is due to be published in the scientific journal, "Aquatic Conservation" later in 2021. An additional detailed disclosure of the comparative research and experimentation by the applicant evaluating the function and performance of the prior Sharksafe Barrier in comparison to the improved exclusion barrier of the present disclosure and the results thereof are documented in a report entitled: "Evaluating the Shark Deterrent Effects of the Novel Exclusion Barrier in Comparison to the Rigorously Tested Sharksafe Barrier Technology" by C. P. O'Connell [School for Marine Science and Technology, University of Massachusetts Dartmouth, 706 South Rodney French Boulevard, New Bedford, Mass. 02744, USA and O'Seas Conservation Foundation, Bronx, N.Y., USA (2021)], which is yet to be published and is also incorporated by reference herein in its entirety. The results and findings from the research and experiments detailed in the above referenced reports have yielded a new and more effective exclusion barrier as described and claimed in the present disclosure for humanely protecting designated areas from access to sharks and rays and to further enhance the protection of humans and other marine life in such designated areas.

SUMMARY OF THE INVENTION

In accordance with the present invention, there is provided an improved exclusion barrier comprising a plurality of elongate barrier members extending in a generally upright condition, the improvements comprising, 1) the use of multiple flexible connecting elements to interconnect designated rows of elongate barrier members at the middle and/or apex thereof to provide a semi-net like area for the prevention of sharks passing through upper portions of the barrier and maximizing the exclusion capabilities of the overall barrier network, 2) linearly spaced anchoring locations having flexible interconnecting magnet-containing mechanisms between each anchor location, which allow for vertical and horizontal magnet and magnetic field movement in coordination with wave motion and water-current energy, 3) in addition to permanent magnets, the inclusion of hydroelectric power generation mechanisms for powering electromagnets within the elongate members to produce a stronger electro-magnetic deterrent field across the barrier network, and 4) providing telescoping mechanisms within one or more elongate barrier members to allow for a variance in length of each member in coordination with changing wave and water levels and to provide additional pump action for hydro-electric power generation within each elongate member.

This summary is not intended to identify all essential features of the claimed subject matter, nor is it intended for use in determining the scope of the claimed subject matter. It is to be understood that both the foregoing general description and the following detailed description are exemplary and are intended to provide an overview or framework to understand the nature and character of the disclosure.

BRIEF DESCRIPTION OF THE DRAWINGS

The accompanying drawings are incorporated in and constitute a part of this specification. It is to be understood that the drawings illustrate only some examples of the disclosure and other examples or combinations of various examples that are not specifically illustrated in the figures may still fall within the scope of this disclosure. The invention will now be described, by way of example only with reference to the accompanying representative drawings in which.

DETAILED DESCRIPTION WITH REFERENCE TO THE DRAWINGS

Figure 1:
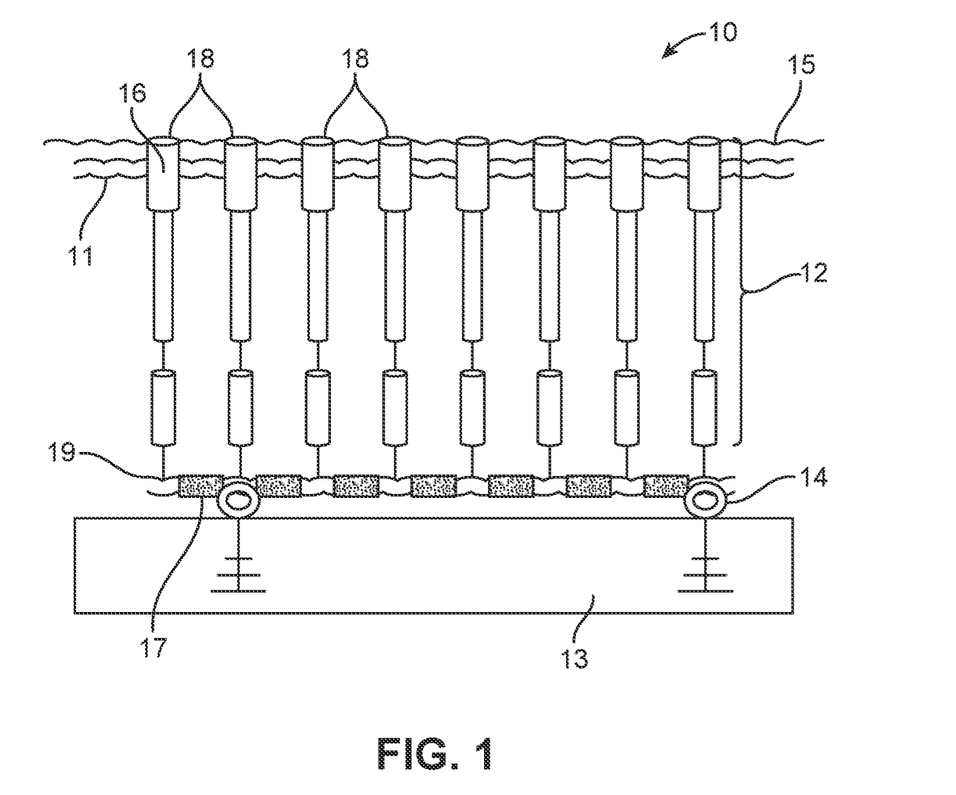
FIG. 1 illustrates a front profile view of an outer or front row of one embodiment of a barrier array in accordance with the invention.

An embodiment of an outer or front row portion from an exclusion barrier array (10) is shown in FIG. 1 and includes a plurality of interconnected elongate members (12) each anchored to a sea floor (13) by means of a spiral type of anchoring base, particularly suitable for soft sea bottoms (14) and extending in a generally upright position towards the sea surface (15). The elongate members (12) are arranged so as to have the appearance of a semi-net like appearance due to the use of interconnecting elements (11), such as a flexible heavy duty 1/0 chain removably attached between the elongate members at the upper and/or middle portion of the barrier array, in addition to the use of interconnecting elements (19) between elongate elements at the location of the anchoring base (14), as shown when viewed from within the water, below the sea surface (15). In order to ensure that the elongate members (12) extend in the generally upright position, buoyant material (16, 33) is included within the upper portion of each elongate barrier element and preferably secured within each elongate member (12) at its upper end (18). The buoyant material (16, 33) is preferably secured internally within the top portion of each elongate member (12) to allow each said member to extend and contract substantially vertically together in a telescoping manner, as shown in FIG. 4, with the rise and fall of the sea level surface so as to maintain and maximize the coverage of the net-like area and to better encapsulate the designated area to be protected.

Figure 2:
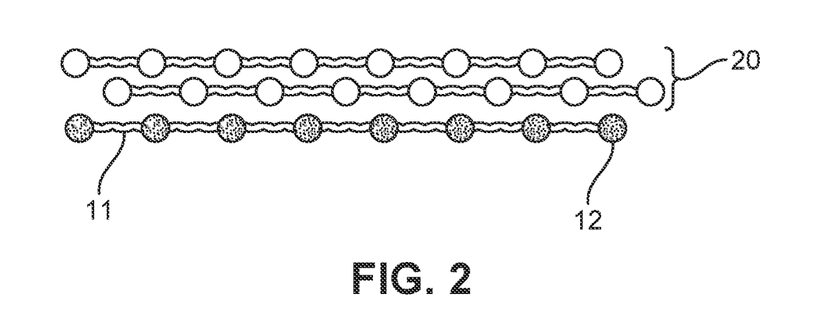
FIG. 2 illustrates a top plan view showing an array of three rows of staggered and interconnected elongate barrier members forming a barrier array in accordance with the invention.
Figure 3:
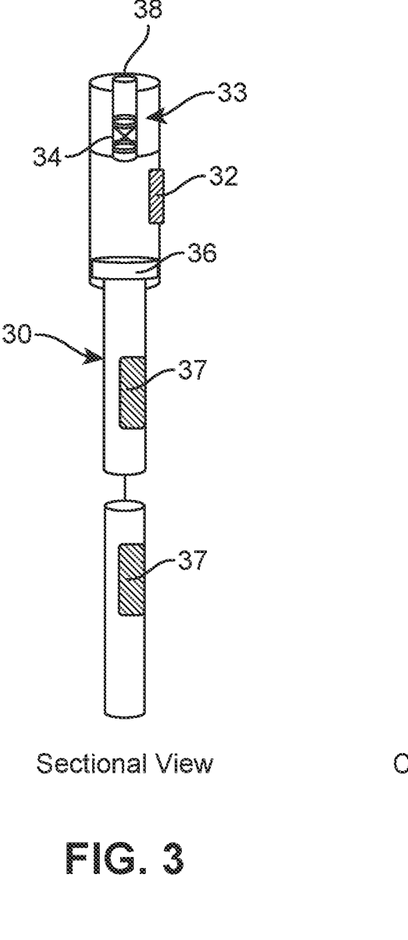
FIG. 3 illustrates a three-dimensional sectional view of an embodiment of an anchored elongate member, which forms part of an outer or front row from the barrier array illustrated in FIG. 1.

Referring to a further preferred embodiment of the exclusion barrier of the present invention, and its components, a barrier array as shown in FIGS. 1 and 2, may be composed of at least three, 25 m long alternating rows of barrier piping to form an array of elongate members (12). As shown in FIG. 3, the outer barrier row is constructed of piping equipped with equally spaced 3.2×2.54 cm N52 Neodymium ($Nd_2Fe_{14}B$) disc magnets (37), whereas the two inner rows of elongate members comprise non-magnetized piping as shown in FIG. 2 (i.e. white circles (20)). As illustrated in FIG. 1 depicting a front elevation view of the outer row of piping comprising the elongate members (12) of at least 2 m in length when contracted and an inner telescoping unit allows each of the pipes to extend to a maximum length of about 3 m. Each of the pipes are separated by 0.76 m and anchored to the seafloor using a flexible heavy duty 2/0 chain (19). To facilitate the exclusion barrier's semi-net-like appearance, flexible heavy-duty 1/0 chain (11) may be attached to the upper and/or middle portion of each elongate member of the barrier array. Located between each adjacent elongate pipe and along the lower chain (19) a 15.2×10.2×5.1 cm grade C8 $BaFe_{12}O_{19}$ permanent magnet (17) is secured to the chain. The chain (19) may also be anchored to the seafloor (13) by Sealux stainless steel spiral anchors (14).

As shown in FIG. 3 the internal structure of the elongate barrier members forming the first (outer) row of the barrier structure, preferably incorporates at least one DC 12V 180 N electromagnet (32), which is directly connected to one 12V hydroelectric turbine-driven power generator (34). A stopper (36) is also attached to the apex of the lower portion of the telescoping pipe (30) to facilitate water flow through an opening (38) at the top portion of the elongate member. A hydroelectric power generator (34) is positioned within high-density buoyancy foam (33) at the top portion of each elongate barrier element (18). The maximized water flow through the opening (38) at the top portion of the elongate member powers the hydroelectric generator (34), which maximizes the voltage produced, particularly during heavy sea conditions (e.g. waves that exceed 0.25 m). The second and third rows of PVC piping (FIG. 2) remain non-magnetized and contain only high-density foam to maximize elongate member buoyancy.

Figure 4:
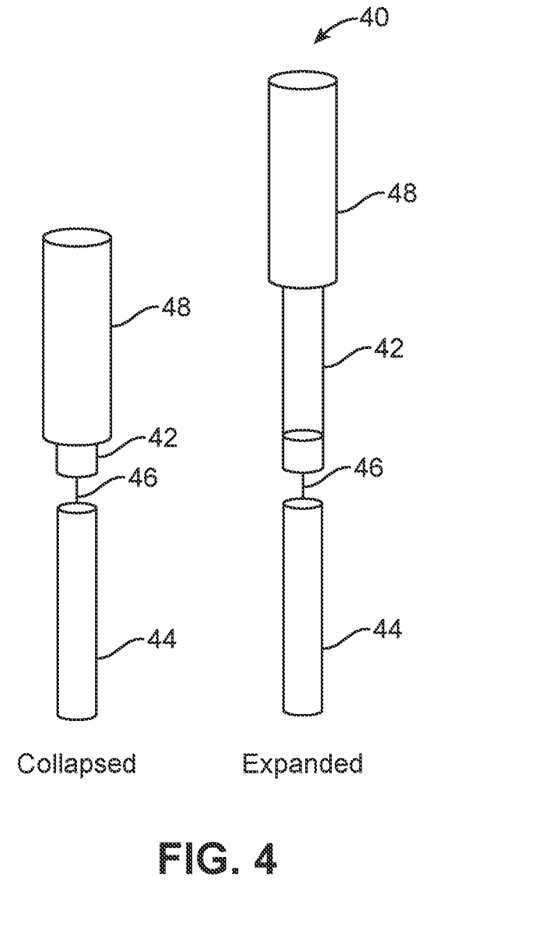
FIG. 4 illustrates a three-dimensional view of an embodiment of an anchored elongate member further illustrating the function of a telescoping component therein.

In another preferred embodiment of the exclusion barrier as shown in FIG. 4, in particular exemplifying the telescoping feature of the elongate members (40), a portion (42) of each member (40) is constructed of 0.5 m long×3.81 cm diameter polyvinyl chloride ("PVC") piping and is secured to a telescoping PVC pipe that may extend to a maximum length of about 3 m to ensure that the pipes maintain constant contact with the surface of changing sea levels. In addition to the telescoping component of the PVC piping, an internal water turbine with a 12V hydroelectric power generator is inserted within each pipe member and is connected to a DC 12V 180N electromagnet (as shown in FIG. 3). In alternative embodiments, 9V and 6V generators and electromagnets may be utilized. As changing sea levels ebb and flow and with increases in wave energy (e.g. produced by wind or boat wakes), the telescoping movement of each elongate barrier member causes the funneling of water through the internal water turbine (34) and through the top of each pipe member (38) to provide intermittent power to the electromagnet (32). Additionally, high density foam (33) may be pre-shaped and fitted within the upper region of the pipe to maximize buoyancy and facilitate both funneling of water through the turbine and telescoping extension and contraction of each member.

In certain embodiments, to ensure the uniformity of the barrier, especially in association with wave activity or when sharks make contact with portions of the barrier, the upper regions of the telescoping pipes may be interconnected by 1/0 heavy duty chain (11). In addition to the first row of piping for each experimental region, two subsequent rows can be deployed (i.e. Rows 2 and 3) and comprise non-magnetized pipes that serve as additional visual stimuli to approaching marine animals. The preferred spacing of such pipes of 0.76 m (FIG. 2) in rows 2 and 3 (20) are such that each barrier member is positioned so that the piping is staggered with the piping in the first row to maximize the barrier's visual stimulus. A typical row of elongate members (12) may comprise from 25 to 32 elongate members or more per row.

Figure 5:
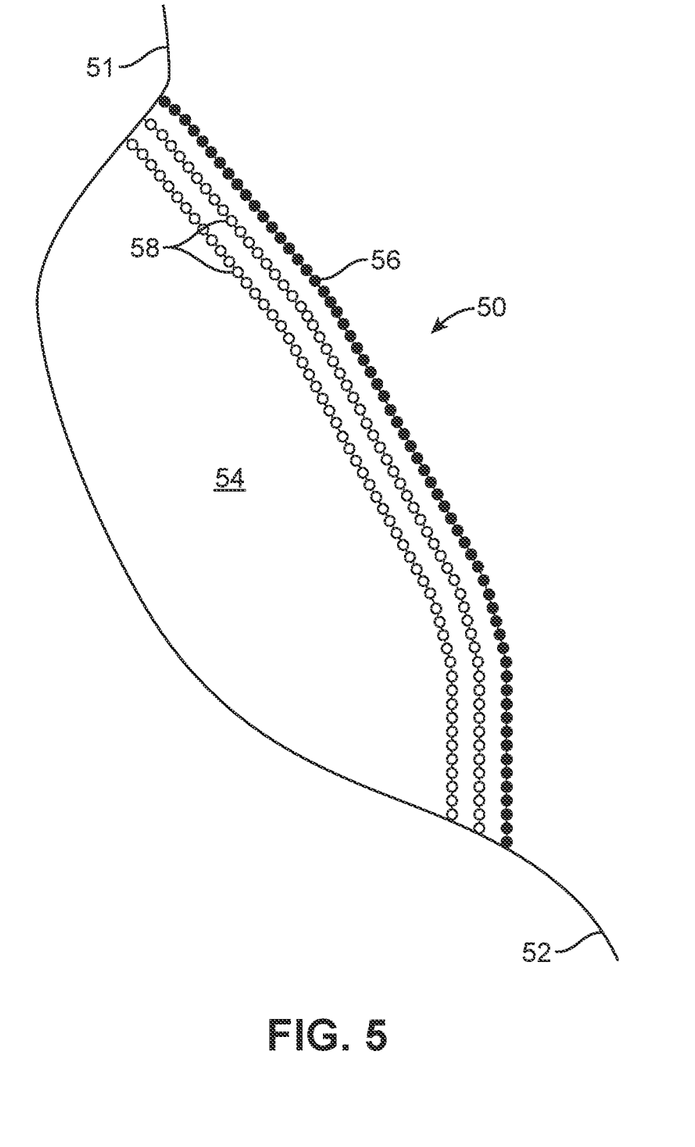
FIG. 5 illustrates a plan view of a designated barrier area with the improved exclusion barrier array deployed between two points of coastline.

Referring also to FIG. 5 the barrier (10) will typically be arranged to protect a beach or similar bathing area and may thus be constructed with multiple rows of elongate members of relatively extensive length. Each row of the exclusion barrier should have at least three, preferably four or more, elongate members (12) in its width. These members may be staggered and not form uniform, orthogonal rows respective to the width of the barrier.

It will be appreciated that the elongate members (12) can be made of any suitable material and can have any suitable configuration. Other appropriate polymeric materials may be used to form the elongate members, such as high-density polyethylene ("HDPE") piping or other polymeric foam materials. The elongate members may also be formed of non-polymeric materials such as biodegradable, eco-friendly and/or naturally occurring materials. In a further such embodiment of the exclusion barrier, 3-inch diameter bamboo tubing may be utilized to form each of the elongate members (12). As also shown in FIGS. 1 and 4, each elongate member (12, 40) can be articulated along its length. In such embodiment each elongate member (40) is divided into two segments (42, 44), which are secured together by a length of chain (46) or other flexible cord-like means and allows the segments (42, 44) to pivot relative to each other. The articulation permits the segments (42, 44) to move partially autonomously under action from water currents and results in a generally more upright orientation, or rather less bent orientation, of the members (40) in oceanic currents. This feature, in addition to the telescoping feature of the elongate members, shown in FIGS. 3 and 4, assists in maintaining the upper ends (18, 48) of each elongate member near the surface of the sea (15).

The anchoring base of the present disclosure may vary and the base (14) may include evenly spaced sand spiral anchors (i.e. for soft sea bottoms) or rock anchors (e.g. for hard sea bottoms) to secure the barrier structure to the seafloor (13). Anchors are not provided for each elongate barrier member but are rather preferably spaced between several barrier members (e.g. a spiral anchor every 3-5 barrier members). This will allow the magnets (17) placed on the flexible connecting element (19) at the lower portion of the outer row to move with respect to wave energy, thus exposing interacting sharks to varying magnetic fields and thereby maximize the deterrent effect of a barrier array and minimize shark habituation.

Previous barriers utilized anchoring bases designed to limit or prevent individual movement between elongate members and to provide a more massive anchoring structure. Such previous barrier designs implemented a rigorously secured barrier to the seafloor that prevented magnets from moving up and down in the water column (less than a few centimeters). More specifically, magnets were placed directly on concrete or flexible anchoring bases that remained fully stationary. Such a design resulted in detrimental effects, such as the habituation of interacting organisms, which rendered magnets ineffective after long term exposure.

In contrast, as shown in FIG. 1, the exclusion barrier of the present invention utilizes flexible connecting mechanisms (19), that enable the respective rows of elongate members (12) to move in both a substantially vertical and horizontal plane together with wave and current energy, which results in enhanced magnetic flux rotation/movement and effectively minimizes the chance for sharks to interact with barrier locations having a minimal magnetic field, but more likely interact with areas of varying magnetic field strengths, and thus more effectively eliminate shark habituation.

FIG. 5 shows an embodiment of the present invention extending between two points of a coastline (51, 52) to enclose a designated exclusion area (54). The exclusion barrier array (50) comprises at least three rows of elongate members made in accordance with the present disclosure with an outer row having a plurality of magnetized members (56), similar to the array (10) row of elongate members (12) illustrated in FIG. 1, and at least two inner rows having a plurality of non-magnetized members (58) similar to the profile shown in FIG. 2. Each row of elongate members has linearly spaced anchors to secure the accompanying rows of elongate buoyant members to the sea floor. The exclusion barrier also includes buoyant elongate members in each row having the telescoping feature disclosed herein as shown in FIGS. 3 and 4, so that each elongate member may vary in length and extend or contract with changing sea surface levels.

Figure 6A:
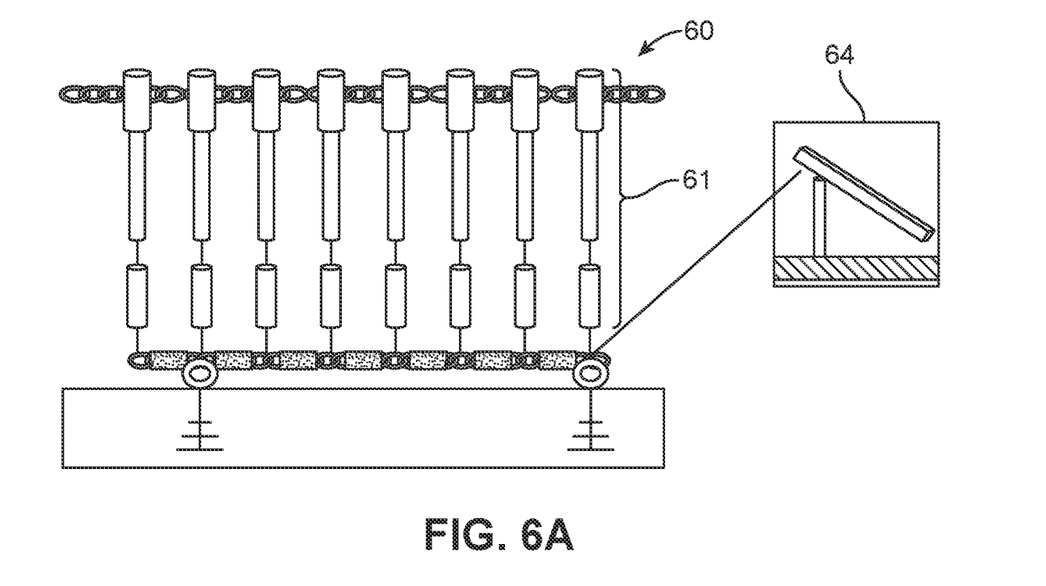
FIGS. 6a and 6b illustrate a front elevation view of an outer or front row of another embodiment of a barrier array and a three-dimensional view of an elongate member used in such a barrier array, utilizing a solar panel power source to generate and supply electrical power to electromagnets placed within or on the elongate members in accordance with the present invention.
Figure 6B:
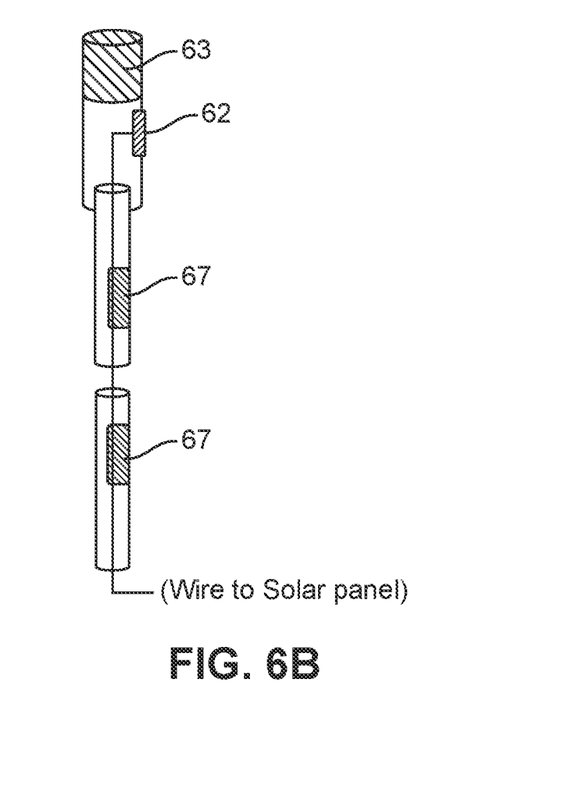
Figure 7A:
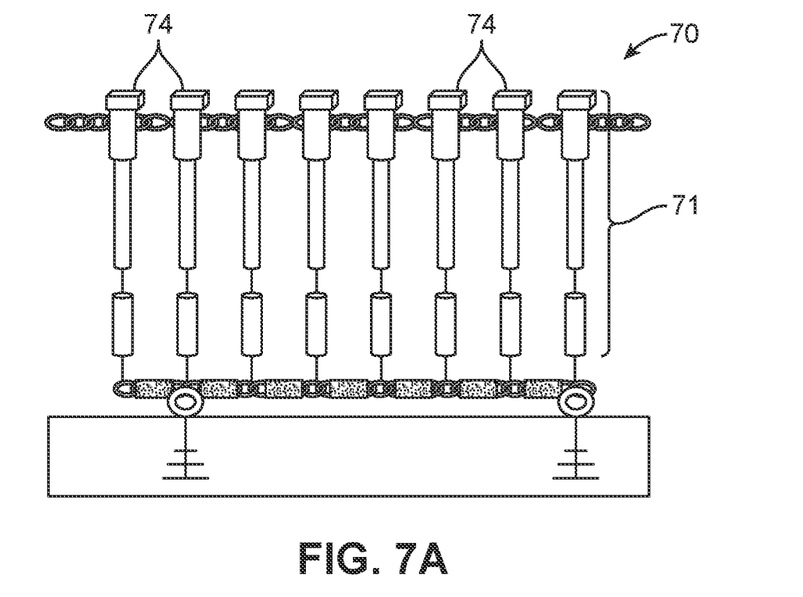
FIGS. 7a and 7b illustrate a front elevation view of an outer or front row of another embodiment of a barrier array and a three-dimensional view of an elongate member used in such a barrier array, utilizing individual mini-solar panels attached to the apex of each elongate member to generate and supply electrical power to electromagnets placed within or on the elongate members in accordance with the present invention.
Figure 7B:
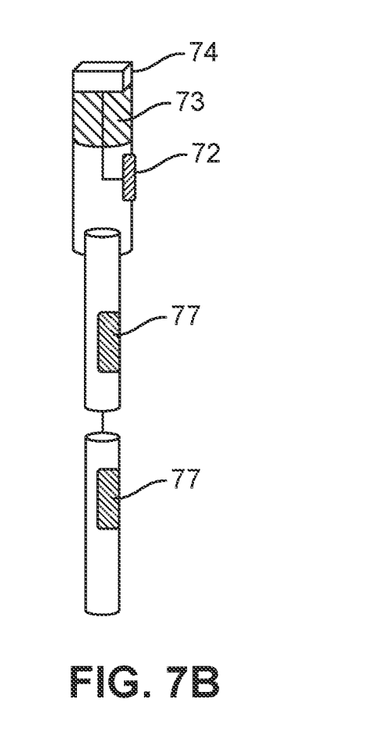

FIGS. 6 and 7 show further embodiments of the present invention, wherein an array of elongate members utilize solar power generation to supply electric power to the electromagnets positioned within or on respective elongate members. In one of the embodiments, depicted in FIGS. 6a and 6b, an array of elongate members (60) are shown having each elongate member (61) in the array electrically connected to at least one or more 12V solar panels (64) that are positioned either on land or in a secure location on the water surface adjacent to the exclusion barrier array (60). Each solar panel (64) may be electrically connected by wire or wireless means to a land-based capacitor (not shown), and through which may be electrically connected to individual electromagnets (62) placed within or on the elongate members (61) so that each electromagnet can be supplied with power throughout the day in low-light conditions and at night. As in previously described embodiments, each elongate member may use high-density buoyancy foam (63) and permanent magnets (67) positioned within or on each elongate member (61).

In another embodiment, depicted in FIGS. 7a and 7b, an array of elongate members (70) are shown having each elongate member (71) in the array electrically connected to at least one or more 3-6V mini-solar panels (74) placed securely at the apex of each elongate member (71). Each of the mini-solar panels will generate electricity to power electromagnets (72) placed within or on each elongate member (71). In addition a capacitor (not shown) may be placed within each elongate member (71) to store energy to facilitate the supply of electrical power to each electromagnet (72) throughout the day in low-light conditions and at night. Each elongate member (71) may also use high-density buoyancy foam (73) and permanent magnets (77) positioned within or on each elongate member (71).

The exclusion barrier of the present invention provides an improved environmentally friendly alternative to the shark barrier disclosed and claimed in the U.S. '209 Patent, as well as to conventional anti-shark devices such as shark nets, drum lines or exclusion nets. The shark barrier is strong enough to resist oceanic tidal currents and its features for creating a semi-net like structure, which can adjust to changing sea levels, and magnetic mechanisms for providing wide ranging and fluctuating magnetic fields for over-stimulating sharks' and rays' electro-sensory systems make it a very effective and significantly improved exclusion barrier. The barrier is much less detrimental to the ecosystem than existing barriers as it is not aimed at catching sharks, but rather at deterring them. At the same time it is not detrimental to other aquatic creatures.

As used in this specification and the appended claims, the singular forms "a", "an" and "the" include plural referents, unless the context clearly dictates otherwise. Similarly, the adjective "another," when used to introduce an element, is intended to mean one or more elements. The terms "comprising," "including," "having" and similar terms are intended to be inclusive such that there may be additional elements other than the listed elements.

Additionally, where a method described above does not explicitly require an order to be followed by its steps or an order is otherwise not required based on the description or claim language, it is not intended that any particular order be inferred. Likewise, where a method claim below does not explicitly recite a step mentioned in the description above, it should not be assumed that the step is required by the claim.

It is noted that the description and claims may use geometric or relational terms. These terms are not intended to limit the disclosure and, in general, are used for convenience to facilitate the description based on the examples shown in the figures. In addition, the geometric or relational terms may not be exact. For instance, walls may not be exactly perpendicular or parallel to one another because of, for example, roughness of surfaces, tolerances allowed in manufacturing, etc., but may still be considered to be perpendicular or parallel.

The invention claimed is:

1. An exclusion barrier comprising a plurality of elongate members extending in a generally upright condition between a sea floor and a sea surface, wherein the elongate members are arranged in a plurality of parallel rows, wherein at least each outer row includes at least three elongate members;
   the elongate members further comprising,
      at least one electro-magnet positioned within the upper portion of each said elongate member,
      at least one water turbine mechanism positioned within the upper portion of each said elongate member for supplying hydro-electric power generation to said at least one electro-magnet, and
      at least one telescoping mechanism positioned within each elongate barrier member for increasing and decreasing the length of each said elongate member, and for providing water flow through the said at least one turbine mechanism for facilitating power generation to each said electro-magnet;
the said elongate members each having multiple flexible connecting elements for interconnecting each said elongate barrier member at the middle and/or apex portion thereof to provide an exclusion area; and
      a plurality of parallel rows of said at least three elongate members being staggered with respect to each said parallel row to form an exclusion barrier array.

2. The exclusion barrier as claimed in claim 1, wherein each said row of said elongate members is secured to the sea floor by at least one anchoring base, said anchoring base comprising,
   a plurality of linearly-spaced anchoring locations along the length of each said row,
   each said anchoring base having a flexible interconnecting mechanism positioned between each said anchoring location,
   said interconnecting mechanisms also comprising,
   at least one permanent magnet,
   said interconnecting mechanism also providing for vertical and horizontal movement of each said permanent magnet in coordination with the wave motion and water-current energy within the designated sea location of said exclusion barrier.

3. The exclusion barrier as claimed in claim 2, wherein the one or more permanent magnets are Neodymium disc magnets.

4. The exclusion barrier as claimed in claim 2, wherein the one or more said permanent magnets are Barium-Ferrite magnets.

5. An elongate member for use in an exclusion barrier comprising,
   an upper portion,
      having at least one electro-magnet positioned within the upper portion of said elongate member, and
      at least one water turbine mechanism positioned within the upper portion of each elongate member for supplying hydro-electric power generation to said at least one electro-magnet, and
   a lower portion,
      having at least one telescoping mechanism positioned within the lower portion of each elongate member,
      for increasing and decreasing the length of each said elongate member, and
      for providing water flow through the said at least one turbine mechanism for facilitating power generation to each said electro-magnet.

6. The exclusion barrier as claimed in claim 1, wherein at least one or more of the elongate members in rows other than the outer row of the barrier are non-magnetized.

7. The exclusion barrier as claimed in claim 1, wherein the upper portion of each elongate member is at least partially filled with a buoyant material.

8. The elongate member as claimed in claim 5, wherein the upper portion is at least partially filled with a buoyant material.

9. The elongate member as claimed in claim 5, wherein the upper portion and lower portion are formed of polyethylene pipe material.

10. The elongate member as claimed in claim 5, wherein the upper portion and lower portion are formed of polyvinyl chloride pipe material.

11. The elongate member as claimed in claim 5, wherein the upper portion and lower portion are formed of a plastic foam material.

12. The elongate member as claimed in claim 5, wherein the upper portion and lower portion are formed of a naturally occurring biological material.

13. The elongate member as claimed in claim 12, wherein the naturally occurring biological material is comprised of bamboo tubing.

14. The exclusion barrier as claimed in claim 1, wherein at least one or more of the elongate members are made of a plastic foam material.

15. The exclusion barrier as claimed in claim 1, wherein at least one or more of the elongate members are formed of polyethylene pipe material.

16. The exclusion barrier as claimed in claim 1, wherein at least one or more of the elongate members are formed of polyvinyl chloride pipe material.

17. The exclusion barrier as claimed in claim 1, wherein the upper portion and lower portion of the elongate member are formed of a naturally occurring biological material.

18. The exclusion barrier as claimed in claim 17, wherein the naturally occurring biological material is comprised of bamboo tubing.

19. An exclusion barrier comprising a plurality of elongate members extending in a generally upright condition between a sea floor and a sea surface, wherein the elongate members are arranged in a plurality of parallel rows, wherein at least each outer row includes at least three elongate members;
   the elongate members further comprising,
      at least one electro-magnet positioned within the upper portion of each said elongate member,
      at least one solar power generation source securely positioned to the upper portion of each said elongate member for supplying electric power to said at least one electro-magnet, and at least one telescoping mechanism positioned within each elongate barrier member for increasing and decreasing the length of each said elongate member;

the said elongate members each having multiple flexible connecting elements for interconnecting each said elongate barrier member at the middle and/or apex portion thereof to provide an exclusion area; and a plurality of parallel rows of said at least three elongate members being staggered with respect to each said parallel row to form an exclusion barrier array.

20. The exclusion barrier as claimed in claim 19, wherein the solar-power generation source for supplying electric power to said at least one electro-magnet, comprises at least one or more solar panels secured to a land-based location or a water surface-based location, adjacent to the exclusion barrier array.

\* \* \* \* \*